(12) United States Patent
Sun et al.

(10) Patent No.: US 12,541,030 B2
(45) Date of Patent: Feb. 3, 2026

(54) METHOD AND APPARATUS FOR GNSS NAVIGATION

(71) Applicant: Samsung Electronics Co., Ltd., Gyeonggi-do (KR)

(72) Inventors: Debo Sun, Milpitas, CA (US); William Bradley Stewart, Monte Sereno, CA (US)

(73) Assignee: Samsung Electronics Co., Ltd (KR)

( * ) Notice: Subject to any disclaimer, the term of this patent is extended or adjusted under 35 U.S.C. 154(b) by 329 days.

(21) Appl. No.: 18/113,950

(22) Filed: Feb. 24, 2023

(65) Prior Publication Data

US 2024/0134058 A1 Apr. 25, 2024

Related U.S. Application Data

(60) Provisional application No. 63/417,508, filed on Oct. 19, 2022.

(51) Int. Cl.
*G01S 19/19* (2010.01)
*G01S 19/39* (2010.01)
*G01S 19/52* (2010.01)

(52) U.S. Cl.
CPC ............ *G01S 19/19* (2013.01); *G01S 19/393* (2019.08); *G01S 19/52* (2013.01)

(58) Field of Classification Search
CPC ......... G01S 19/19; G01S 19/393; G01S 19/52
See application file for complete search history.

(56) References Cited

U.S. PATENT DOCUMENTS

| | | | |
|---|---|---|---|
| 9,599,475 B2 | 3/2017 | Sato et al. | |
| 10,502,576 B2 | 12/2019 | Trigoni et al. | |
| 10,564,296 B2* | 2/2020 | Hide | G01S 19/44 |
| 10,740,599 B2* | 8/2020 | Uchida | G06V 40/23 |
| 11,435,485 B2 | 9/2022 | McDaniel et al. | |
| 2004/0186695 A1 | 9/2004 | Aoshima et al. | |
| 2018/0107867 A1 | 4/2018 | Uchida et al. | |
| 2019/0086552 A1* | 3/2019 | Tuck | G01S 19/19 |

FOREIGN PATENT DOCUMENTS

CN 105125216 A * 12/2015

* cited by examiner

*Primary Examiner* — Robert W Hodge
*Assistant Examiner* — Bongani Jabulani Mashele
(74) *Attorney, Agent, or Firm* — The Farrell Law Firm, P.C.

(57) ABSTRACT

A system and a method are disclosed for tracking a position of a body. The system and method including the steps of receiving combined movement data, the combined movement data including first movement data of the body and second movement data of an object connected to the body, wherein the second movement data is data of a movement occurring relative to the body; transforming the first movement data using a first transformation technique; transforming the second movement data using a second transformation technique that is different than the first transformation technique; determining a velocity estimation bias of the body based on a combination of the transformed first movement data and the transformed second movement data; and generating a velocity estimation of the body with the determined velocity estimation bias of the body.

20 Claims, 6 Drawing Sheets

METHOD AND APPARATUS FOR GNSS NAVIGATION

CROSS-REFERENCE TO RELATED APPLICATION

This application claims the priority benefit under 35 U.S.C. § 119(e) of U.S. Provisional Application No. 63/417,508, filed on Oct. 19, 2022, the disclosure of which is incorporated by reference in its entirety as if fully set forth herein.

TECHNICAL FIELD

The disclosure generally relates to position and velocity estimates using satellite navigation. More particularly, the subject matter disclosed herein relates to improvements to a body movement trajectory estimation/calculation using a global navigation satellite system (GNSS) (e.g., using position information).

SUMMARY

For GNSS navigation systems, a GNSS receiver may be installed or put on the body of a carrier, such as, for example, a vehicle. But for some applications, such as those involving sports or use of a watch, a GNSS receiver is installed or put on a rotating or waving arm of the carrier (e.g., the wrist of runners or swimmers). In this case, a GNSS receiver measurement is the movement of the rotating or waving arm, instead of the body. The GNSS receiver senses the movement as a combination of body movement and arm movement relative to the body. In some cases (e.g., sports applications), it may be preferable to accurately calculate the body movement, however the arm movement may introduce inconsistencies and variations to the body movement calculation.

To solve this problem, Kalman filters can be used to calculate body movement trajectory. A Kalman filter is a mathematical tool that can be used to estimate the state of a system over time. In the context of body movement trajectory calculation, a Kalman filter can be used to estimate the position and velocity of a person's body based on sensor data provided from an electronic device. This can be useful for a variety of applications, such as tracking a body's center point movement, human-computer interaction, or for athletic applications.

One issue that occurs when using Kalman filters in GNSS navigation is that body movement (i.e., the position and velocity at the body center point) and relative arm movement are modeled together, and the relative arm movement may be modeled as white noise, thereby degrading the navigation performance of the Kalman filter.

To overcome these issues, systems and methods are described herein for accurately calculating a position and/or velocity for GNSS navigation systems by modeling body movement separate from relative arm movement in some instances.

According to an aspect of the disclosure, a method for tracking a position of a body includes receiving combined movement data, the combined movement data including first movement data of the body and second movement data of an object connected to the body, wherein the second movement data is data of a movement occurring relative to the body; transforming the first movement data using a first transformation technique; transforming the second movement data using a second transformation technique that is different than the first transformation technique; determining a velocity estimation bias of the body based on a combination of the transformed first movement data and the transformed second movement data; and generating a velocity estimation of the body with the determined velocity estimation bias of the body.

According to another aspect of the disclosure, an electronic device configured to track a position of a body includes a processor and a memory storing program instructions that, when executed by the processor, configure the electronic device to receive combined movement data, the combined movement data including first movement data of the body and second movement data of an object connected to the body, wherein the second movement data is data of a movement occurring relative to the body; transform the first movement data using a first transformation technique; transform the second movement data using a second transformation technique that is different than the first transformation technique; receive a velocity estimation bias of the body based on a combination of the transformed first movement data and the transformed second movement data; and generate a velocity estimation of the body with the determined velocity estimation bias of the body.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
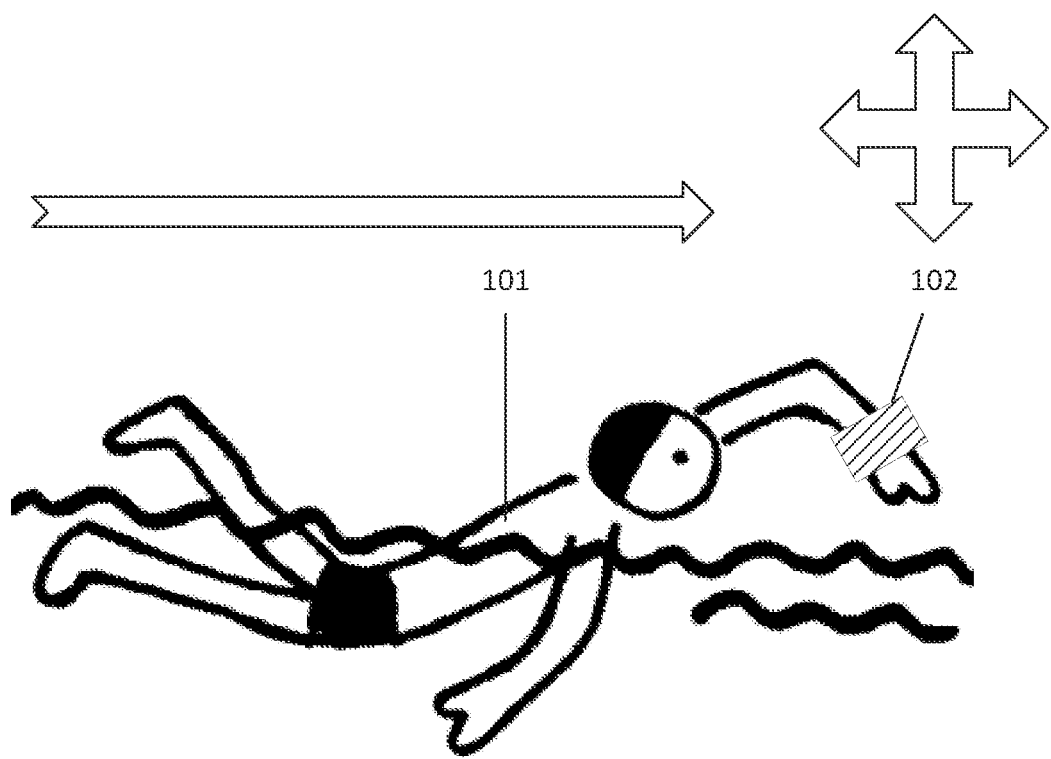
FIG. 1 illustrates an environment in which a GNSS system may be used, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration."

Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purposes only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

As used herein, the term "body" refers to a structural component. In some instances, the term "body" may refer to an immobile object. In other instances, the term "body" may refer to a movable object, such as a vehicle or a biological body.

FIG. 1 illustrates an environment in which a GNSS system may be used, according to an embodiment.

Referring to FIG. 1, a user 101 is swimming in a body of water. An electronic device 102 is located on the user's wrist. The electronic device may include sensors for detecting satellite signals. The user 101 swims in a horizontal direction. The horizontal direction of the user 101 may correspond to the body movement direction. The electronic device 102 moves in a vertical direction and a horizontal direction. The vertical and horizontal directions of the electronic device 102 may correspond to the relative arm movement directions. As the user 101 swims, the electronic device 102 may move in and out of the water. When the electronic device 102 is below the surface of the water, a GNSS signal strength may be weak, as compared to when the electronic device 102 is above the surface of the water. Thus, it may be difficult to detect a position, velocity, and/or distance when swimming since GNSS satellite signals obtained while swimming may include uncertainties.

GNSS is a system of satellites that transmit signals to receivers on Earth, allowing them to determine their precise location, velocity, and time. A well-known GNSS system is the global positioning system (GPS). However, there are also other GNSS systems in operation or under development, such as GLONASS (Russia), Galileo (Europe), BeiDou (China), and QZSS (Japan).

GNSS systems work by using a network of satellites in orbit around the Earth that transmit signals containing information about their position and the current time. A GNSS receiver on the ground, such as a GPS receiver in a car smartphone, watch, or other electronic device, receives these signals and uses the information to calculate its own position and time. Thus, GNSS allows a user to determine their precise location anywhere on the Earth's surface.

A Kalman filter is an algorithm used to estimate the state of a system, such as the position and velocity of an object, based on measurements of the system over time. A Kalman filter uses a mathematical model of the system and a process for estimating the state of the system from the measurements (e.g., position measurements using GNSS signals), taking into account the uncertainty in both the model and the measurements.

GNSS navigation Kalman filter algorithms are used with watches and other sports applications. Body movement and relative arm movement may be modelled individually, and estimated separately by the algorithms. When GNSS signals are weak, and speed is low (e.g., such as when swimming), position propagation with velocity in the navigation Kalman filter should be stopped or tuned if the relative arm movement is not removed from the velocity estimation or if the body movement velocity is not accurately estimated. Smoothing for velocity and heading may also be applied, and position may be projected on the smoothed heading and/or direction. The heading may be used to determine the direction of movement, and velocity can be used to determine a distance traveled. An output navigation position may be estimated with the projected position using a weight.

The heading may refer to the direction and may be measured with degrees. The heading may be measured using a compass, accelerometers, and gyroscopes. On the other hand, the heading can also be estimated using GNSS signals when there are movements. Additionally or alternatively, pseudo-range measurements are used in GNSS and other satellite-based navigation systems to determine the distance between a receiver and a satellite. A pseudo-range measurement is made by comparing the time a signal is transmitted by a satellite to the time it is received by a receiver. The difference between these two times, known as the pseudo-range (PR), is then used to calculate the distance between the satellite and receiver.

Smoothing for velocity may refer to the process of using mathematical techniques to remove noise and fluctuations from a velocity signal. Smoothing may produce a smooth, stable estimate of the underlying velocity, despite the presence of noise and other disturbances (e.g., GNSS signals having varying strength due to the electronic device moving above and below a water surface while a user is swimming). Different methods for smoothing velocity signals may include moving averages, Kalman filtering, low-pass filtering and/or least squares estimation (LSQ).

LSQ is a method for finding the best-fitting parameters of a model for a set of observations. LSQ may be used to minimize a sum of the squares of the differences between the observations and the model predictions. LSQ may be used to adjust position estimates by comparing the predicted and measured observations of GNSS measurements.

In order to accurately extract the body movement from a measured combined movement (a movement including the body movement and the relative arm movement), a GNSS navigation algorithm or Kalman filter should be redesigned, and the system mode should be re-built. In a GNSS navigation system and method, the combined movement measured with GNSS may be divided into the body movement and the arm movement relative to the body.

Body movement can be modeled as a normal moving case. The relative arm movement can be modeled as a uniform distribution, written as U(a, b), and a probability density function is shown in Equation (1), below:

$$f(x) = \begin{cases} \frac{1}{b-a}, & \text{for } a \le x \le b \\ 0, & \text{for others} \end{cases} \quad (1)$$

where, a=−b and b>0. For a position of the relative arm movement, b may be about 0.7 meters (m). For a speed of the relative arm movement, b may be about 1 m/second (s).

If the position of the relative arm movement is small, it can be ignored in a GNSS navigation Kalman filter, or be considered as extra noise in determining position. However, the speed of the relative arm movement should consistently be similar to the body movement, and the speed should not be ignored in the GNSS navigation Kalman filter because it can cause errors in velocity estimation and position propagation in the Kalman filter.

In this case, since the speed of the relative arm movement is uniformly distributed, its effects may be considered to be negligible (e.g., it may be predicted to be zero). Therefore, the speed can be calculated with an LSQ after the body velocity is removed from a delta pseudo-range (DR) measurement.

If relative arm movement and body movement are modelled together in a GNSS navigation Kalman filter, the effect of the relative arm movement may be negligible since the relative arm movement is uniformly distributed. In addition, the relative arm movement and body movement may not be separated as individual variables. Therefore, if the velocity and position propagation are not tuned in the Kalman filter, errors may be introduced.

In order to avoid introducing errors, a GNSS navigation strategy or algorithm may be used. The strategy or algorithm may be executed by an electronic device, a controller, or a processor.

The algorithm may model body movement and relative arm movement individually in a GNSS navigation calculation. The algorithm may include variables to account for body movement, relative arm movement, and measurement noise.

For the GNSS navigation Kalman filter, only body movement may be modeled with state equations. State equations are mathematical equations used to describe the dynamics of a system, such position and velocity. A Kalman filter makes use of these equations to estimate the state of a satellite over time, using a combination of a mathematical model of the system and actual measurements of the system. The state equations may include body movement, relative arm movement, and measurement noise.

After body movement is estimated in the GNSS navigation Kalman filter, DR residuals may be used to estimate the relative arm movement velocity with LSQ. Theoretically, the mean of the estimated relative arm movement velocity should be zero. If it is not zero, the mean of the estimated relative arm movement velocity may be used to compensate the body movement velocity estimate.

The mean of the estimated relative arm movement velocity can be calculated with the average value of the relative arm movement velocity calculated using LSQ. Ideally, position can be calculated in the same way as velocity.

Since the relative arm movement position change is small (e.g., about 0.7 m), it may be ignored, or considered as PR measurement noise.

In the GNSS navigation Kalman filter, a state estimation calculation may be provided by Equation (2), below:

$$\hat{X}^+(k) = \hat{X}^-(k) + K(k)[Z(K) - H(k)\hat{X}^-(k)] \quad (2)$$

where X is a Kalman filter state variable and includes position, velocity, and other variables (e.g., $X = [X_p^T X_v^T \ldots ]^T$), $X_p$ is a position variable in 3 dimensions, and $X_v$ is a velocity variable in 3 dimensions. $\hat{X}^+(k)$ is a state variable estimate at time k, $\hat{X}^-(k)$ is a state variable prediction at time k. K(k) is a Kalman filter gain, Z(K) is a Kalman filter measurement, and H(k) is a measurement matrix.

A state prediction for position may be calculated using Equation (3), below:

$$\hat{X}_p^-(k)=\hat{X}_p^+(k-1)+\hat{X}_v^+(k-1)\cdot dT \quad (3)$$

where, dT is a position propagation time period, $X_p$ is a position variable in 3 dimensions, and $X_v$ is a velocity variable in 3 dimensions.

A state prediction for velocity may be set forth using Equation (4), below:

$$\hat{X}_v^-(k)=\hat{X}_v^+(k-1) \quad (4)$$

where, $X_v$ is a velocity state in 3 dimensions.

The state propagation error covariance matrix P of a Kalman filter is set forth in Equation (5), below;

$$P^-(k)=\Phi(k)P^+(k-1)\Phi^T(k-1)+Q(k-1) \quad (5)$$

where, $P^-(k)$ is a state prediction error covariance matrix at time k, $P^+(k-1)$ is a state estimation error covariance matrix at time k−1, Q(k−1) is a process noise covariance matrix at k−1. Φ is a state transition matrix. Other equations for navigation Kalman filters may also be used.

In a GNSS sports application case (e.g., when using a watch as a swimming trajectory monitor), the relative arm movement may not be able to be predicted since the relative arm movement has a uniform distribution, causing the velocity estimation to be inaccurate. In this case, the state prediction for position should be calculated with Equation (6), below (instead of with Equation (2), above):

$$\hat{X}_p^-(k)=\hat{X}_p^+(k-1)+\alpha\cdot\hat{X}_v^+(k-1)\cdot dT \quad (6)$$

where, α is a weight used to tune velocity usage in position propagation. When velocity is not known or accurately estimated, α can be set to zero. If velocity is only partially known, α may be set as less than one. If velocity is well known (with noise), α may be set to one (a standard Kalman filter case).

A carrier to noise density ratio (CN0) is a measure of the quality of the signal received from a GNSS satellite. CN0 may be defined as the ratio of the received carrier power to the received noise power, measured in decibels. A higher CN0 value indicates a stronger, higher quality signal, while a lower CN0 value indicates a weaker, lower quality signal.

For example, if average GNSS CN0 is low and a swimming speed is slow, α may be set to 0 such that velocity is not used for position propagation. If an average CN0 is low and a swimming speed is fast, α may be set to 0.5 such that a partial velocity is used for position propagation. If an average CN0 is high or a swimming speed is high (fast), α may be set to 1 and a normal position propagation may be used with velocity.

Once a weight factor (e.g., α) is used for position propagation, the covariance of process noise for position in Equation (5) should be enlarged to accommodate the inaccurate position propagation caused by the inaccurate velocity estimation.

In the GNSS navigation Kalman filter, once the velocity is estimated, a GNSS DR measurement residual can be calculated, and used to estimate the relative arm movement velocity with the LSQ method.

To further improve navigation performance for a weak GNSS signal case (e.g., while swimming), smoothing for velocity and heading may be performed. The relative movement velocity estimated with LSQ can be smoothed to retrieve the body velocity estimation bias caused by the Kalman filter calculation. Once the body velocity estimation bias is estimated, it can be used to compensate for body velocity estimation errors. As a result, an accurate body velocity estimation can be obtained, and navigation performance can be improved.

Since the body velocity estimation may have errors in the case of swimming, causing the calculated velocity and/or trajectory heading to have large errors. To get an accurate velocity and/or trajectory heading, a noisy estimated velocity may first be smoothed, then the velocity and/or trajectory heading is calculated from the smoothed velocity. Once an accurate heading is obtained, the GNSS position can be projected for a velocity and/or trajectory heading direction. The output navigation position may be estimated with the projected position using a weight. Thus, navigation performance is improved because the processed trajectory is smoother and more accurate.

Figure 2:
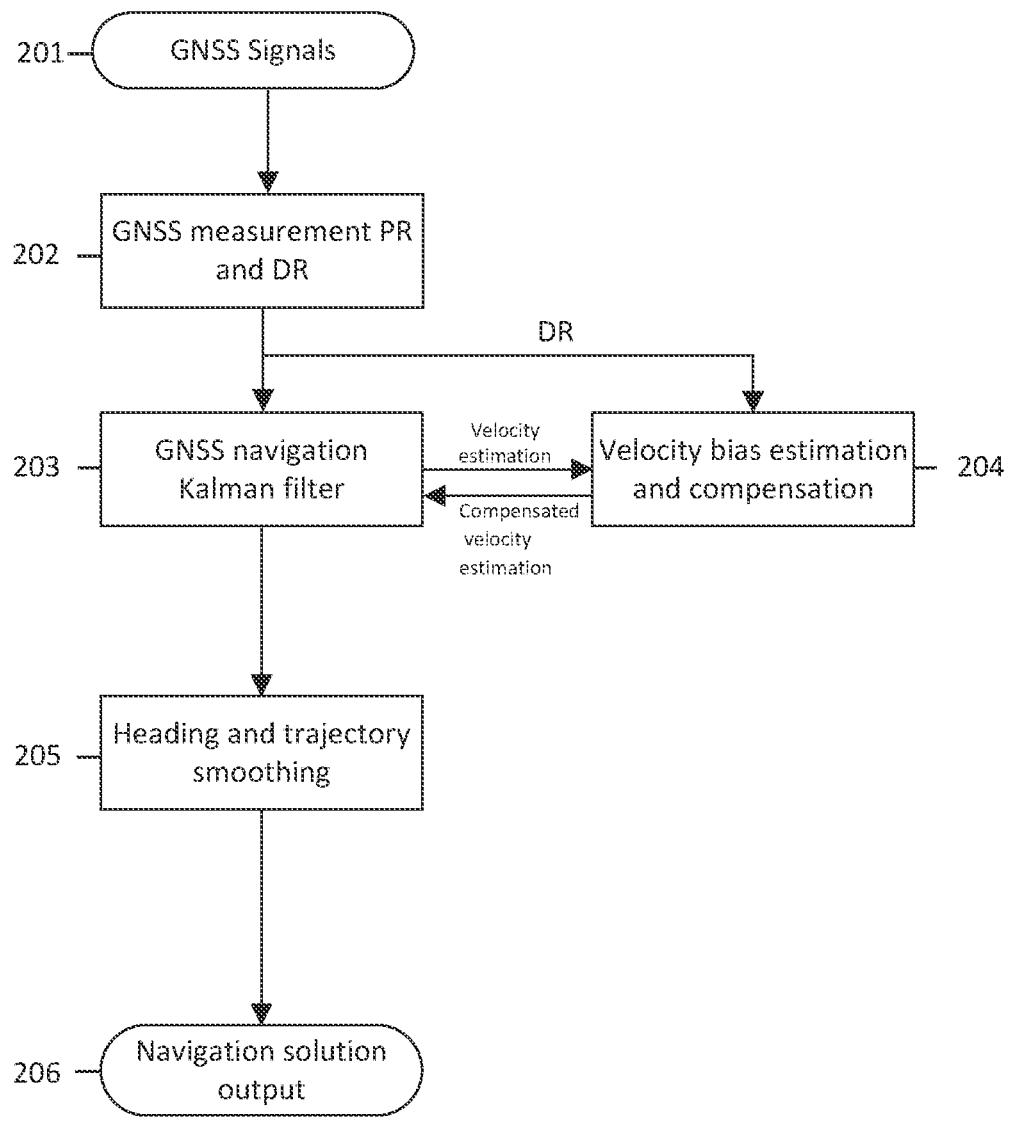
FIG. 2 illustrates a flowchart of using a GNSS system to output a position and/or velocity, according to an embodiment.

FIG. 2 illustrates a flowchart of using a GNSS system to output a position and/or velocity, according to an embodiment.

The steps shown in FIG. 2 may be performed by an electronic device (e.g., a smartwatch), a controller, or a processor. In addition, the steps may be performed in a different order than the order shown. Additionally, some steps may be performed simultaneously.

Referring to FIG. 2, at step 201, GNSS signals are acquired. The GNSS signals may be detected by the electronic device 102 (e.g., a user's watch), and provide an indication of a position. A plurality of GNSS signals may be detected at different times.

At step 202, GNSS measurements include PR and DR. PR and DR can be used to calculate the difference between the measured position and velocity of a GNSS receiver and a predicted position and velocity. Residuals may be errors or discrepancy between the measured PR and DR and the estimated PR and DR calculated with estimated position and velocity, respectively. DR residuals can be used to assess the quality of the body velocity estimate and detect any errors or bias in the body velocity estimate.

At step 203, GNSS navigation is performed by using a Kalman filter. As described above, a state estimation calculation may be calculated using Equation (2), a state prediction for position may be calculated using Equation (3), and a state prediction for velocity may be calculated using Equation (4).

At step 204, velocity bias estimation and compensation are performed. Velocity bias estimation and compensation may be performed based on the subprocess illustrated in FIG. 3.

Figure 3:
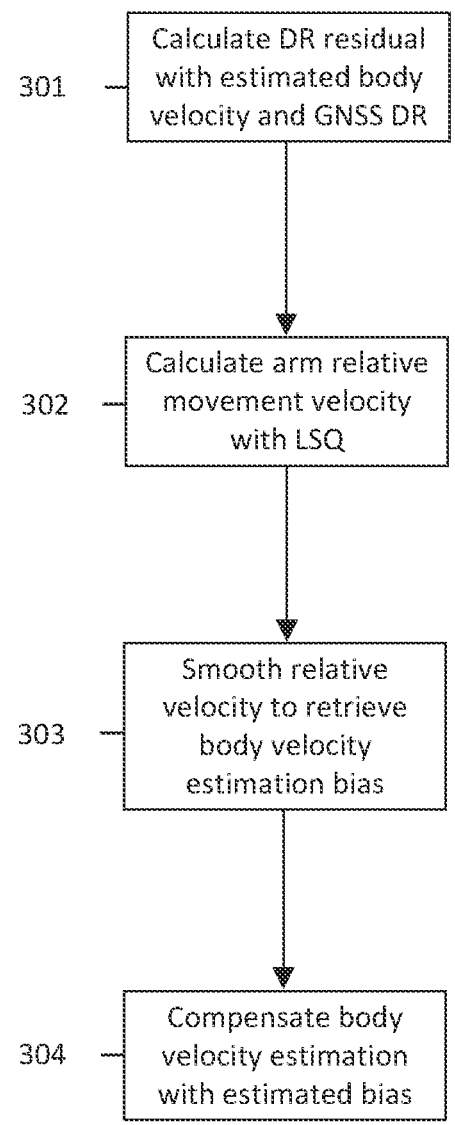
FIG. 3 illustrates a subprocess for performing velocity bias estimation and compensation, according to an embodiment.

FIG. 3 illustrates a subprocess for performing velocity bias estimation and compensation, according to an embodiment.

The steps shown in FIG. 3 may be performed by an electronic device (e.g., a smartwatch), a controller, or a processor. In addition, the steps may be performed in a different order than the order shown. Additionally, some steps may be performed simultaneously.

Referring to FIG. 3, at step 301 one or more DR residuals are calculated with estimated body velocity and GNSS DR. At step 302, arm relative movement velocity is calculated using LSQ. At step 303, relative velocity smoothing is performed to retrieve a body velocity estimation bias. At step 304, the body velocity estimation is compensated using the body velocity estimation bias.

Returning to step 203 of FIG. 2, the velocity bias estimation acquired from step 204 may be used to determine whether the velocity estimation is accurate. When the velocity estimation is not accurate, state position may be calculated using Equation (6), above, using a as a weight to tune velocity usage in position propagation.

At step 205, heading and trajectory smoothing are performed to remove noise and fluctuations from state position prediction. Heading and trajectory smoothing may be performed based on the subprocess illustrated in FIG. 4.

Figure 4:
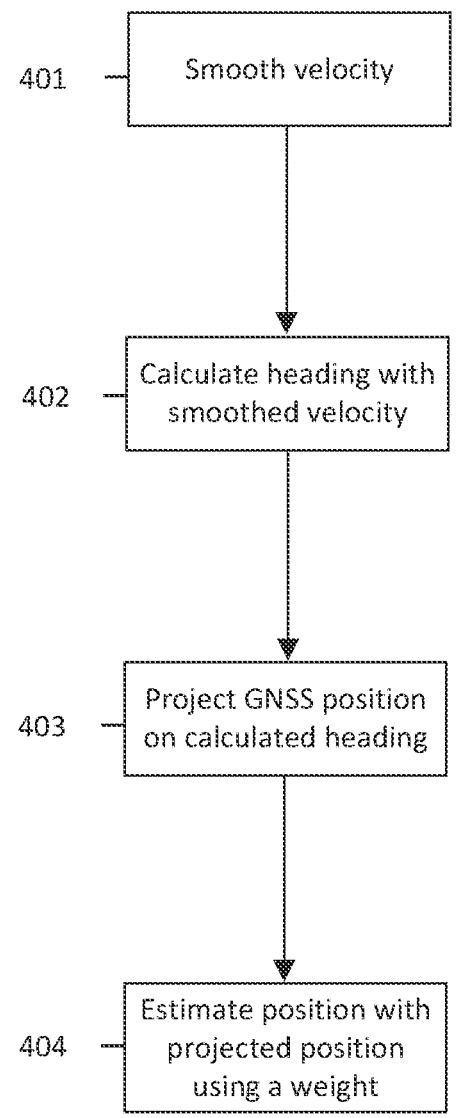
FIG. 4 illustrates a subprocess for performing heading and trajectory smoothing, according to an embodiment.

FIG. 4 illustrates a subprocess for performing heading and trajectory smoothing, according to an embodiment.

The steps shown in FIG. 4 may be performed by an electronic device (e.g., a smartwatch), a controller, or a processor. In addition, the steps may be performed in a different order than the order shown. Additionally, some steps may be performed simultaneously.

Referring to FIG. 4, at step 401, the velocity is smoothed. At step 402, a heading is calculated using the smoothed velocity. At step 403, a GNSS position is projected on the calculated heading. At step 404, a position is estimated with a projected position using a weight. For example, the weight described in step 404 may be a number included in a given range (e.g., 0 to 1), and may be used to account for (e.g., correlated to) the projected position (e.g., body position).

Referring to step 206 of FIG. 2, a navigation solution is output.

Figure 5:
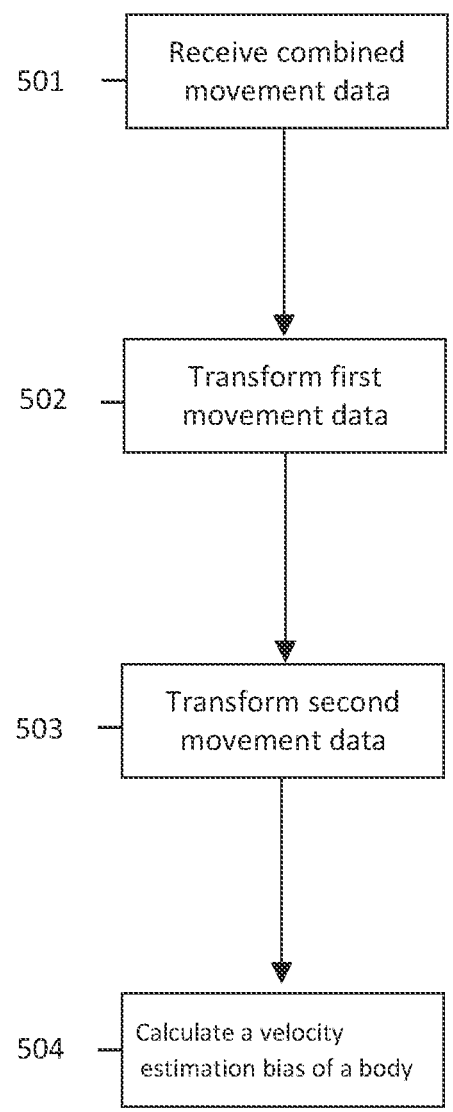
FIG. 5 illustrates a flowchart for tracking a velocity estimation bias of a body, according to an embodiment.

FIG. 5 illustrates a flowchart for tracking a velocity estimation bias of a body, according to an embodiment.

The steps shown in FIG. 5 may be performed by an electronic device (e.g., a smartwatch), a controller, or a processor. In addition, the steps may be performed in a different order than the order shown. Additionally, some steps may be performed simultaneously.

Referring to FIG. 5, at step 501, combined movement data is received. The combined movement data may include first movement data of a body (e.g., a user's body) (body movement) and second movement data of an object (e.g., a smartwatch) (relative arm movement) connected to the body, wherein the second movement data is data of a movement occurring relative to the first movement data of the body.

At step 502, the first movement data is transformed using a first transformation technique (e.g., using a Kalman filter).

At step 503, the second movement data is transformed using a second transformation technique (e.g., using LSQ).

At step 504, a velocity estimation bias of the body is estimated. The body velocity estimation bias may be based on a combination of the transformed first movement data and the transformed second movement data. Furthermore, a weight may be applied to estimate the bias.

Figure 6:
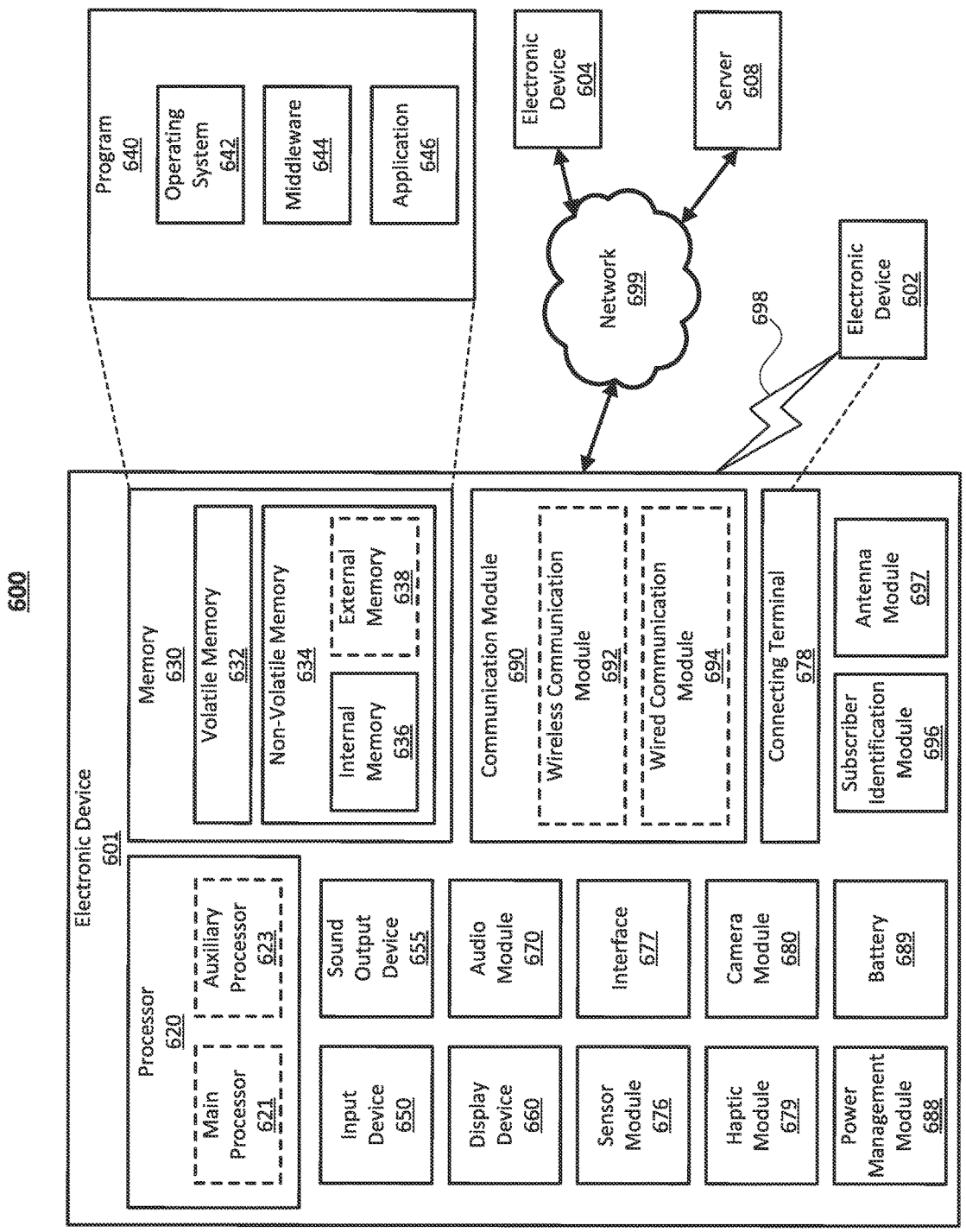
FIG. 6 is a block diagram of an electronic device in a network environment 600, according to an embodiment.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 640, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 694. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The electronic device 601, the electronic device 602, and/or the electronic device 604 may be the electronic device 102, which may perform the subroutines in FIGS. 2-5. In addition, components of the electronic device 102 may be embodied by components of the electronic device 601, the electronic device 602, and/or the electronic device 604 and provide the structure necessary to perform the steps of FIGS. 2-5. For instance, the step 202 in FIG. 2 may be performed by the communication module 690 and/or the antenna module 697; step 301 in FIG. 3 may be performed by the processor 620; step 402 in FIG. 4 may be performed by the processor 620; and step 504 in FIG. 5 may be performed by the processor.

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 646 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

The systems and methods disclosed herein are improvements over prior approaches because navigation position performance is enhanced by disabling or tuning position propagation (updating the positions of objects) with velocity prediction in the navigation Kalman filter. In addition, navigation position performance is improved by reducing position errors and making a trajectory smoother, by smoothing position and velocity in the navigation output. Additionally, an accuracy calculation of a distance traveled is improved. Also, speed estimation accuracy is improved when relative arm movement velocity is estimated independently.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for estimating a movement trajectory of a body, the method comprising:
   receiving combined movement data, the combined movement data including first movement data of the body and second movement data of an object connected to the body, wherein the second movement data is data of a movement occurring relative to the body;
   transforming the first movement data using a first transformation technique;
   transforming the second movement data using a second transformation technique that is different than the first transformation technique;
   determining a velocity estimation bias of the body based on a combination of the transformed first movement data and the transformed second movement data;
   generating a velocity estimation of the body with the determined velocity estimation bias of the body;
   projecting a body position based on the first movement data, wherein the first movement data comprises reduced-noise position data;
   calculating a weight for the projected body position; and
   estimating an updated position of the body by applying the calculated weight to the projected body position.

2. The method of claim 1, further comprising:
   projecting the body position using smoothed first movement data.

3. The method of claim 1, wherein the object is a biological limb and the combined movement data is received by a satellite signal receiver of an electronic device affixed to the biological limb.

4. The method of claim 1, wherein the combined movement data includes a set of data points, each having a position value or a velocity value.

5. The method of claim 1, wherein the second movement data is uniformly distributed with respect to the first movement data.

6. The method of claim 5, wherein the second transformation technique includes applying a least square estimation to the second movement data.

7. The method of claim 1, wherein the first transformation technique includes applying a Kalman filter to the first movement data.

8. The method of claim 7, wherein the Kalman filter applies, through tuning a usage of the estimated velocity in position propagation with a velocity estimation reliability.

9. The method of claim 1, wherein determining the velocity estimation bias of the body based on the combination of the transformed first movement data and the transformed second movement data comprises smoothing the second movement data to obtain a body velocity estimation bias and applying a weight to the body velocity estimation.

10. The method of claim 1, wherein the velocity estimation bias is determined based on delta pseudo ranges calculated using the combination of the transformed first movement data and the transformed second movement data.

11. An electronic device configured to estimate a movement trajectory of a body, the electronic device comprising:
a processor, and
a memory storing program instructions that, when executed by the processor, configure the electronic device to:
receive combined movement data, the combined movement data including first movement data of the body and second movement data of an object connected to the body, wherein the second movement data is data of a movement occurring relative to the body;
transform the first movement data using a first transformation technique;
transform the second movement data using a second transformation technique that is different than the first transformation technique;
receive a velocity estimation bias of the body based on a combination of the transformed first movement data and the transformed second movement data;
generate a velocity estimation of the body with the determined velocity estimation bias of the body;
project a body position based on the first movement data, wherein the first movement data comprises reduced-noise position data;
calculate a weight for the projected body position; and
estimate an updated position of the body by applying the calculated weight to the projected body position.

12. The electronic device of claim 11, wherein the program instructions, when executed by the processor, further configure the electronic device to:
project the body position using smoothed first movement data.

13. The electronic device of claim 11, wherein the object is a biological limb and the combined movement data is received by a satellite signal receiver of an electronic device affixed to the biological limb.

14. The electronic device of claim 11, wherein the combined movement data includes a set of data points, each having a position value or a velocity value.

15. The electronic device of claim 11, wherein the second movement data is uniformly distributed with respect to the first movement data.

16. The electronic device of claim 15, wherein the second transformation technique includes applying a least square estimation to the second movement data.

17. The electronic device of claim 11, wherein the first transformation technique includes applying a Kalman filter to the first movement data.

18. The electronic device of claim 17, wherein the Kalman filter applies, through tuning a usage of the estimated velocity in position propagation with a velocity estimation reliability.

19. The electronic device of claim 11, wherein determining the velocity estimation bias of the body based on the combination of the transformed first movement data and the transformed second movement data comprises smoothing the second movement data to obtain a body velocity estimation bias and applying a weight to the body velocity estimation.

20. The electronic device of claim 11, wherein the velocity estimation bias is determined based on delta pseudo ranges calculated using the combination of the transformed first movement data and the transformed second movement data.

* * * * *